United States Patent

McNeill

[15] 3,702,036
[45] Nov. 7, 1972

[54] ADJUSTABLE LEAD LINE CONNECTOR

[72] Inventor: John McNeill, 210 South Catalina, Apt. 10, Pasadena, Calif. 91106

[22] Filed: July 22, 1971

[21] Appl. No.: 164,990

[52] U.S. Cl. ............................. 43/44.85, 24/129 R
[51] Int. Cl. ............................................ A01k 91/04
[58] Field of Search .......... 43/44.85, 44.84; 24/115 J, 24/115 K, 123 G, 123 H, 129 R, 129 B, 129 D, 210

[56] References Cited

UNITED STATES PATENTS

| | | |
|---|---|---|
| 585,564 | 6/1897 | Freeman ................... 43/44.85 |
| 1,047,654 | 12/1912 | Klersy ...................... 43/44.85 |
| 2,466,939 | 4/1949 | Fowler .................. 43/44.85 X |
| 3,533,184 | 10/1970 | Kerr .......................... 43/44.84 |

*Primary Examiner*—Aldrich F. Medbery
*Assistant Examiner*—Daniel J. Leach
*Attorney*—Francis X. Lojacono, Sr.

[57] ABSTRACT

An adjustable lead line connector device whereby lead lines having fish hooks attached thereto can be positioned along the lower portion of a fishing line, the connector comprising a flat flexible member which is provided on one inner face thereof with a protruding nipple oppositely disposed from a matching cup-like securing ring. The ring has an inner diameter corresponding to the diameter of the nipple so that when the flexible member is bent and folded along its center the nipple is received within the ring, securing the connector device to the fishing line. The outer edges of the flexible member are provided with a locking means comprising an elongated tongue having an opening therein and a lip member having a slot therein to receive the elongated tongue therethrough. When the tongue is passed through the slot a lead line having a fish hook thereon is attached to the tongue by means of the opening therein.

5 Claims, 4 Drawing Figures

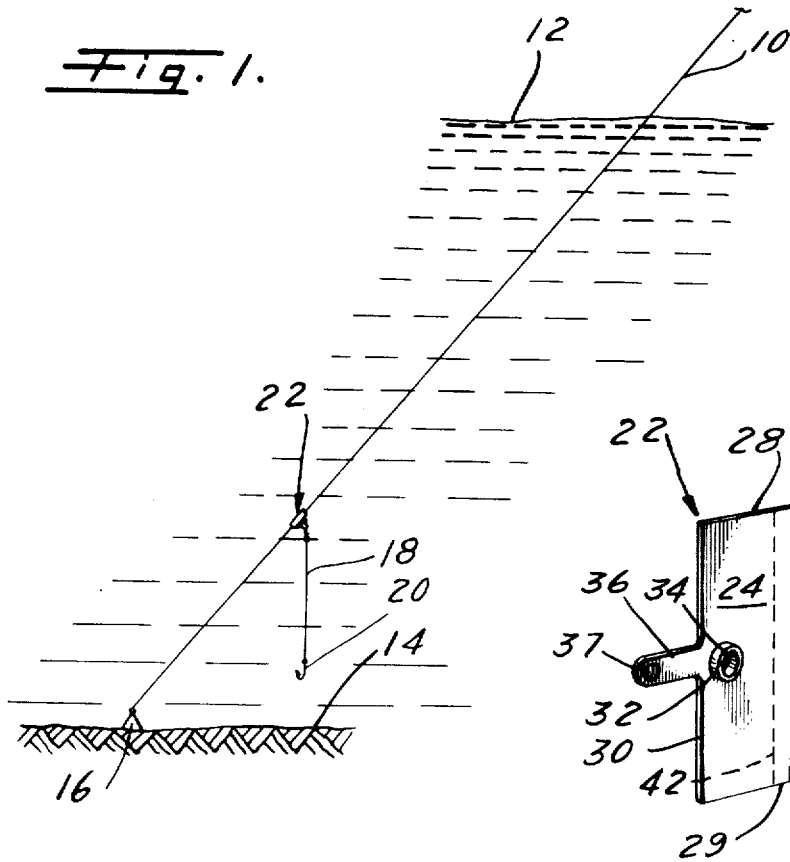
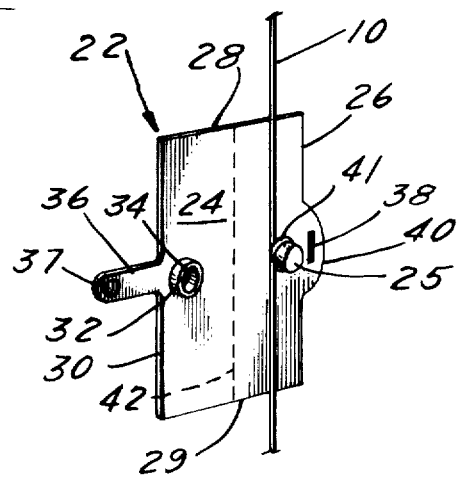
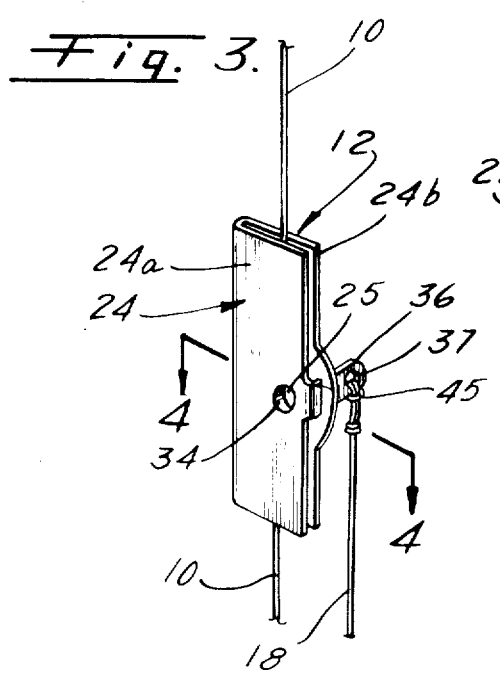
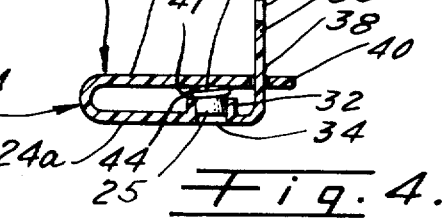

ADJUSTABLE LEAD LINE CONNECTOR

BACKGROUND OF THE INVENTION

1. Field of the Invention

This invention relates to fishing equipment and relates, more particularly, to an adjustable lead line connector device.

2. Description of the Prior Art

There are various kinds of devices and means for securing lead lines to the main fishing lines that are in use today. However, these devices are generally complicated to operate and they cannot be readily attached in an easy and fast manner, nor can they be easily moved along the main fishing line to the proper position required in a given fishing location. There has been a need for a simple means for attaching a lead line or a plurality of lead lines in a manner that anyone not having the proper knowledge or skills in tying different and various knots may be able to position and reposition a lead line in any positive secured manner, regardless of the tugging or pulling exerted upon the lead line when a fish is hooked. In most cases, the fisherman is in a hurry to drop his line or cast it and does not properly attach his lead lines, thus causing the hook to slip to a position where it becomes useless, and he wastes many hours waiting for a catch before the problem is realized. To the applicant's knowledge, there is no device being used that overcomes the present problems as related above.

SUMMARY OF THE INVENTION

The present invention comprises a flat sheet of flexible material such as a pliable plastic, rubber, or the like, which provides a traction between the connector and the cord of the main fishing line. One surface of the flat member is provided with a nipple and a corresponding securing ring, each being an integral part of the flat member and each being oppositely disposed to the other adjacent the opposite elongated edges of said flat member. To removably attach the fishing line to the connector the line is looped about the nipple with at least one full loop at the point that the lead line is desired to be positioned along the main line. In order to prevent disengagement of the connector from the line, as well as to prevent upward or downward slippage of the connector, the connector is bent and folded along its vertical center line whereby the ring can be positioned to receive the nipple therein, causing the loop of the fishing line to be compressed between the ring and one surface of the flat member for a positive securing arrangement.

Extending outwardly from one of the vertical edges is an elongated tongue member which is adapted with an opening or hole for attaching the lead line directly thereto. However, before the lead line is attached thereto the tongue member is passed through a slot that is formed within a lip member which is provided along the oppositely disposed, elongated edge of the flat member, said member being, also, an integral part thereof. When the tongue member is in place and extends outwardly from the slot, the lead line is tied to the hole in the tongue member which aids in the proper securing of the connector to the main fishing line. That is, when the folded flexible member is in its proper position and the tongue is passed through the slot of the lip, it will help to prevent the separation of the securing ring and nipple.

OBJECTS AND ADVANTAGES OF THE INVENTION

The present invention has for an important object the provision of a positive locking connector for fishing lead lines.

It is another object of the invention to provide a lead line connector that can be readily adjustable along the fishing line without completely disengaging the connector from said line.

It is still another object of the invention to provide an adjustable lead line connector that comprises a minimum of parts or members.

Still another object of the invention is to provide a connector of this character that is relatively inexpensive to manufacture.

A further object of the invention is to provide a connector of this character that is simple and rugged in construction and easy to operate.

A still further object of the invention is to provide a connector of this character that is not affected by the elements and can be reused as often as needed.

Other characteristics, advantages and objects of my invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 illustrates a fishing line under water and provided with the said invention;

FIG. 2 is a perspective view of the invention showing the fishing line looped thereon;

FIG. 3 is a perspective view of the connector in a positive locked position, showing a portion of the lead line attached thereto; and FIG. 4 is an enlarged cross-sectional view taken on line 4—4 of FIG. 3.

DESCRIPTION OF THE PREFERRED EMBODIMENT

Referring to the drawings and, more particularly, to FIG. 1, there is illustrated a fishing line 10 extending downwardly under the surface of the water 12 to a point on the ocean floor 14. The line 10 is anchored in place by a typical lead weight 16. Positioned above the weight 16 is a lead line 18 having a fish hook 20 attached to the free end thereof, while the opposite end of said lead line is attached to the present invention which is an adjustable lead line connector indicated generally at 22.

The adjustable lead line connector comprises a somewhat rectangular, flat, flexible sheet 24, preferably made of a flexible plastic; however, rubber or the like material can be used. This rectangular sheet may be any size, although it is contemplated that the vertical length will equal approximately 1 inch and the width thereof will be approximately one-half inch. Integrally formed as a part of the flat member is a nipple member 25 which extends outwardly from one surface thereof and adjacent the vertical edge 26 intermediate the upper and lower edges 28 and 29 respectively. Oppositely disposed from the nipple and adjacent the oppposite vertical edge 30 of the flat member 24 is a securing ring 32 formed as an integral part of said flat member, said ring 32 having an inner diameter 34 in a cup-like shape to correspond to the outer diameter of the mating nipple 25.

Extending outwardly from the edge 30 there is provided a tongue member 36 also as an integral part of sheet 24. Said tongue member 36 is adapted with opening or hole 37 disposed at its free end. The tongue member 36 is aligned with a slot 38 which is vertically positioned within a protruding lip member 40 which is formed as an integral part of the edge 26.

When the connector 22 is to be put into use the fishing line 10 is looped about the nipple 25 by at least one full turn, as shown in FIG. 2 and indicated at 41. When this is accomplished the flexible sheet 22 is bent and folded along the dotted line 42, thereby forming two oppositely disposed walls 24a and 24b, respectively.

Hence, when the walls are folded as illustrated in FIGS. 3 and 4, the securing ring 32 receives the nipple 25 in a tight fit, locking the looped portion 41 of the line 10 between the circular edge 44 of the ring 32 and the inner face of wall 24b. The connector 22 is held in place at the position of the loop by means of the locking action, as described above, and, in addition, the nipple being of a pliable material does not allow the line to slip in either direction.

Tongue 36 is then passed through slot 38 of the lip 40, providing an additional means for preventing the walls 24a and 24b to become separated. It can be seen that lead line 18 having hook 20 is attached at 45 through opening 37. Thus, if a fish is caught the pull on the tongue 36 will not permit the nipple from being displaced or separated from the securing ring. That is, the tongue 36 and lip 40 act as a positive locking means to prevent the connector from disengaging line 10, whether it be from the pulling force of a hooked fish or the snagging of the connector during the time the main line is reeled in.

Even though only one connector and lead line are shown in FIG. 1, it should be understood that a multiplicity of connectors can be used simultaneously by being positioned along the line at proper intervals.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A connector device for connecting lead lines to a fishing line, said device comprising:
   a flat, flexible sheet member which is foldable about its vertical central portion;
   securing means on said sheet member for securing said connector device to said fishing line; and
   a locking means on said sheet member for locking said connector device in a folded position about said fishing line and said locking means including means for positive attachment of said lead line.

2. A connector device as recited in claim 1, wherein said securing means comprises:
   a nipple extending outwardly from one surface of said sheet member; and
   a securing ring extending outwardly from said surface and oppositely disposed from said nipple, said ring having an inner diameter equal to the diameter of said nipple, whereby said nipple is adapted to be received within said securing ring.

3. A connector device as recited in claim 2, wherein said locking means comprises:
   a tongue member extending outwardly from one edge of said sheet member, said tongue having an opening therein for attaching said lead line; and
   a lip member extending from the oppositely disposed edge of said sheet member, said lip having a vertical slot therein aligned to receive said tongue member therethrough.

4. A connector device as recited in claim 3, wherein said securing ring, said nipple, said tongue member and said lip member are formed as an integral part of said flat sheet member.

5. A connector device as recited in claim 4, wherein said flexible sheet member comprises a pliable plastic material.

* * * * *